US012147722B2

(12) United States Patent
Noda

(10) Patent No.: US 12,147,722 B2
(45) Date of Patent: Nov. 19, 2024

(54) IMAGE PROCESSING APPARATUS AND METHOD FOR BRINGING UP JOB HISTORY

(71) Applicant: SHARP KABUSHIKI KAISHA, Sakai (JP)

(72) Inventor: Shoji Noda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/538,188

(22) Filed: Dec. 13, 2023

(65) Prior Publication Data
US 2024/0211194 A1  Jun. 27, 2024

(30) Foreign Application Priority Data

Dec. 22, 2022  (JP) ................. 2022-205846

(51) Int. Cl.
G06F 3/12      (2006.01)
G06F 3/04855   (2022.01)

(52) U.S. Cl.
CPC ........ *G06F 3/1273* (2013.01); *G06F 3/04855* (2013.01); *G06F 3/1203* (2013.01); *G06F 3/1284* (2013.01)

(58) Field of Classification Search
None
See application file for complete search history.

(56) References Cited

U.S. PATENT DOCUMENTS

| | | | | |
|---|---|---|---|---|
| 2015/0046879 A1* | 2/2015 | Orimoto | ............ | G06K 15/005 715/835 |
| 2015/0222770 A1* | 8/2015 | Yoshida | ............ | H04N 1/00482 358/1.15 |
| 2017/0310837 A1* | 10/2017 | Kadoda | ............ | H04N 1/00482 |
| 2018/0191924 A1* | 7/2018 | Kodaira | ............ | G06F 16/245 |
| 2018/0278756 A1* | 9/2018 | Shibukawa | ........ | H04N 1/00411 |
| 2019/0012118 A1* | 1/2019 | Nakajima | ............ | G06F 3/0482 |
| 2019/0310808 A1* | 10/2019 | Osako | ................. | G06F 3/04817 |
| 2022/0206729 A1* | 6/2022 | Akimoto | ............... | G06F 3/1273 |
| 2023/0280949 A1* | 9/2023 | Yoshida | ............... | G06F 3/1285 358/1.15 |
| 2023/0418456 A1* | 12/2023 | Ishibashi | ............ | G06F 3/04847 |

FOREIGN PATENT DOCUMENTS

JP  2018-133091 A  8/2018
JP  2020-062886 A  4/2020

* cited by examiner

Primary Examiner — Henok Shiferaw
(74) Attorney, Agent, or Firm — ScienBiziP, P.C.

(57) ABSTRACT

An image processing apparatus including: an operation inputter that displays an operation screen and receives a user operation; an image processor that executes a job related to image processing; a storage that stores settings related to one or more executed jobs as a job history of each job; and one or more controllers. The one or more controllers: cause the operation inputter to display a job history screen to bring up any of job histories stored in the storage; cause one screen of the job history screen to display all setting items and a setting value of each of the setting items of at least one of the job histories, and cause the operation inputter to receive an operation of bringing up the at least one of the job histories displayed.

6 Claims, 12 Drawing Sheets

IMAGE PROCESSING APPARATUS AND METHOD FOR BRINGING UP JOB HISTORY

TECHNICAL FIELD

The present disclosure relates to an image processing apparatus having a function of bringing up, as a job history, a setting related to an executed job, and a method for bringing up a job history.

BACKGROUND ART

Image processing apparatuses such as a network scanner, a printer, and a multifunction peripheral having these functions are known. In recent years, a user interface that displays a soft key on a screen of a dot matrix display and receives a user operation has been used in many image processing apparatuses.

For such an image processing apparatus that executes a plurality of applications (also called jobs), the following apparatus that facilitates setting for applications is known. The image processing apparatus handles image data including images of one or more documents or one or more pages as a batch of processing, and a unit of the batch of processing is called a job.

It is known that image processing apparatus has a function of storing, in a storage in association with each other, setting content of an executed job and information indicating a function used in the executed job, and bringing up setting content. A first soft key that brings up information indicating the stored setting content and function is displayed on an operation screen of the image processing apparatus. The first soft key displays an icon corresponding to the information indicating the setting content to be brought up and the function to be brought up by the first soft key.

Regarding the operation screen that brings up the information indicating stored setting content and function, the following has been further proposed. An image processing apparatus where display is not an original function has a limit on the size of the screen due to space and cost limitations, and the number of soft keys that can practically be arranged on the screen has an upper limit. Therefore, the upper limit is set to the number of soft keys to be displayed at a time on an operation screen of the image processing apparatus.

SUMMARY

Technical Problem

A function of storing and bringing up a setting content (setting value) and a function (setting item) of an executed job in association with each other is called a job history in this description. The more advanced the function of an image processing apparatus is, the more the number of items of settings included in a job history increases. As the number of setting items increases, it is more troublesome for the user to set the setting items each time, and the usefulness of the job history increases.

When the job history stored in the storage is displayed, if importance is placed on visibility of a list of the job history, there is a limit on information that can be displayed on the screen at a time, and thus there is a case where only a part of the setting items of each job history can be displayed. For example, when destination information such as a mail is long or when the number of destinations is large, there is a case where only a part thereof is displayed.

In this case, the user cannot confirm all of the settings of the job history on the operation screen before bringing up the job history, and needs to confirm the details of the settings after bringing up. This becomes a troublesome operation for the user, and possibly reduces the usefulness of the job history.

The present disclosure has been made in view of the above circumstances, and provides a method for enabling a user to easily confirm all of the settings of a job history before bringing up the job history and ensuring the usefulness of the job history.

Solution to Problem

The present disclosure provides an image processing apparatus including: an operation inputter that displays an operation screen and receives a user operation; an image processor that executes a job related to image processing; a storage that stores settings related to one or more executed jobs as a job history of each of the one or more jobs; and one or more controllers. The one or more controllers: cause the operation inputter to display a job history screen to bring up any of job histories stored in the storage; and cause one screen of the job history screen to display all setting items and a setting value of each of the setting items of at least one of the job histories, and cause the operation inputter to receive an operation of bringing up the at least one of the job histories displayed.

The present disclosure further provides an image processing apparatus including: a communicator that communicates with an external device that displays a screen and receives a user operation; an image processor that executes a job related to image processing; a storage that stores settings related to one or more executed jobs as a job history of each of the one or more jobs; and one or more controllers. The one or more controllers: cause a screen of the external device to display, via the communicator, a job history screen to bring up any of job histories stored in the storage; and cause one screen of the job history screen to display all setting items and a setting value of each of the setting items of at least one of the job histories, and cause an operation of bringing up the at least one of the job histories displayed to be received.

From a different viewpoint, the present disclosure provides a method for bringing up a job history, the method including: causing an operation screen to be displayed on an image processing apparatus or an external device, and receiving a user operation; executing a job related to image processing by using an image processor of the image processing apparatus; storing settings related to one or more executed jobs in a bring-uppable manner as a job history of each of the one or more jobs in a memory; and causing to display, on the operation screen, a job history screen to bring up any of job histories stored in the memory. The job history screen displays all setting items and a setting value of each of the setting items of at least one of the job histories on one screen and has an operation object to receive an operation of bringing up the at least one of the job histories displayed.

In an image processing apparatus according to the present disclosure, a user can easily confirm all settings of a job history before bringing up a job history.

The method for bringing up the job history according to the present disclosure achieves similar functions and effects.

DESCRIPTION OF EMBODIMENTS

Figure 1:
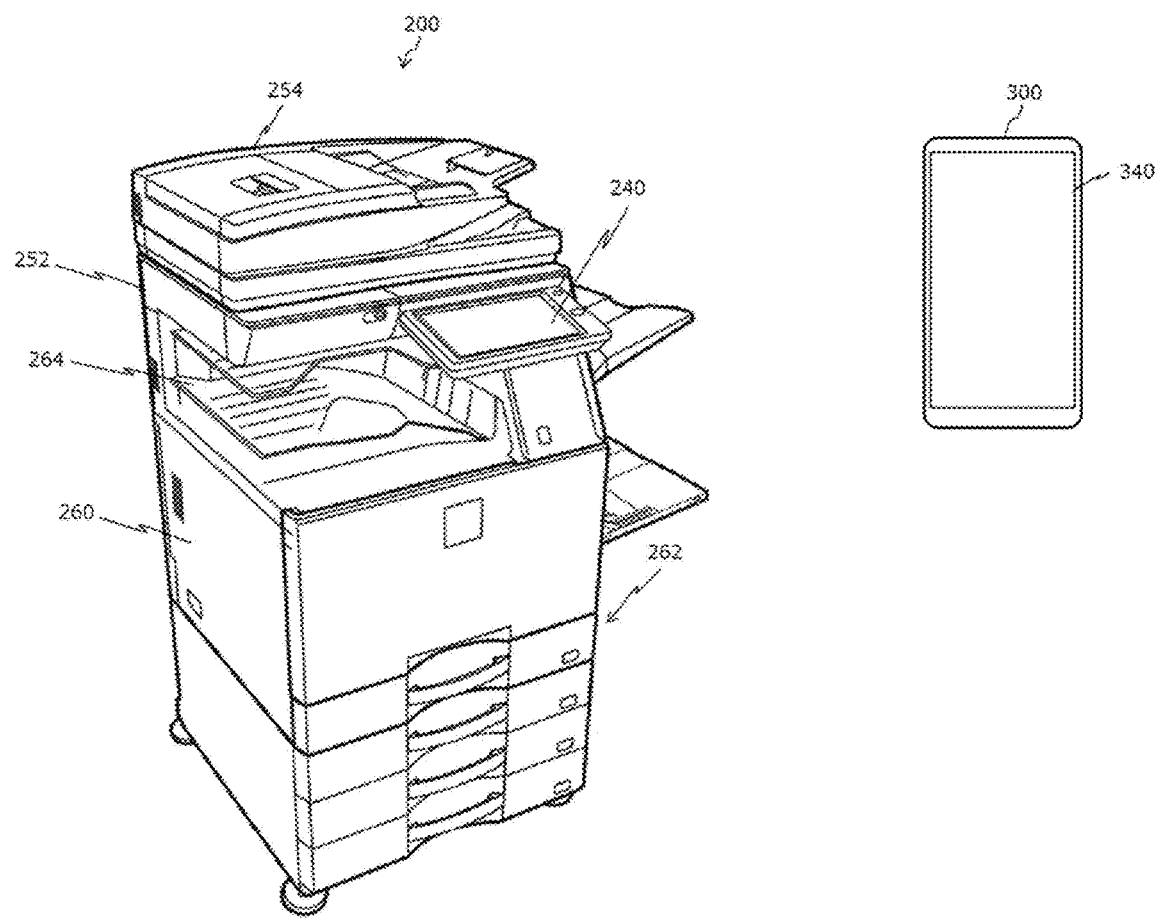
FIG. 1 is an explanatory view illustrating an appearance example of an image processing apparatus according to the present disclosure and an information processing apparatus used by a user of the image processing apparatus.

The present disclosure will be described below in more detail with reference to the drawings. Note that the following description is illustrative in all respects and should not be construed as limiting the present disclosure.
Configuration of Image Processing Apparatus FIG. 1 is an explanatory view illustrating an appearance example of an image processing apparatus according to the present disclosure and an information processing apparatus used by a user of the image processing apparatus. FIG. 1 illustrates a multifunction peripheral as an example of the image processing apparatus and a smartphone as an example of the information processing apparatus. Note that in the present disclosure, whether the user uses the information processing apparatus is optional.

Figure 2:
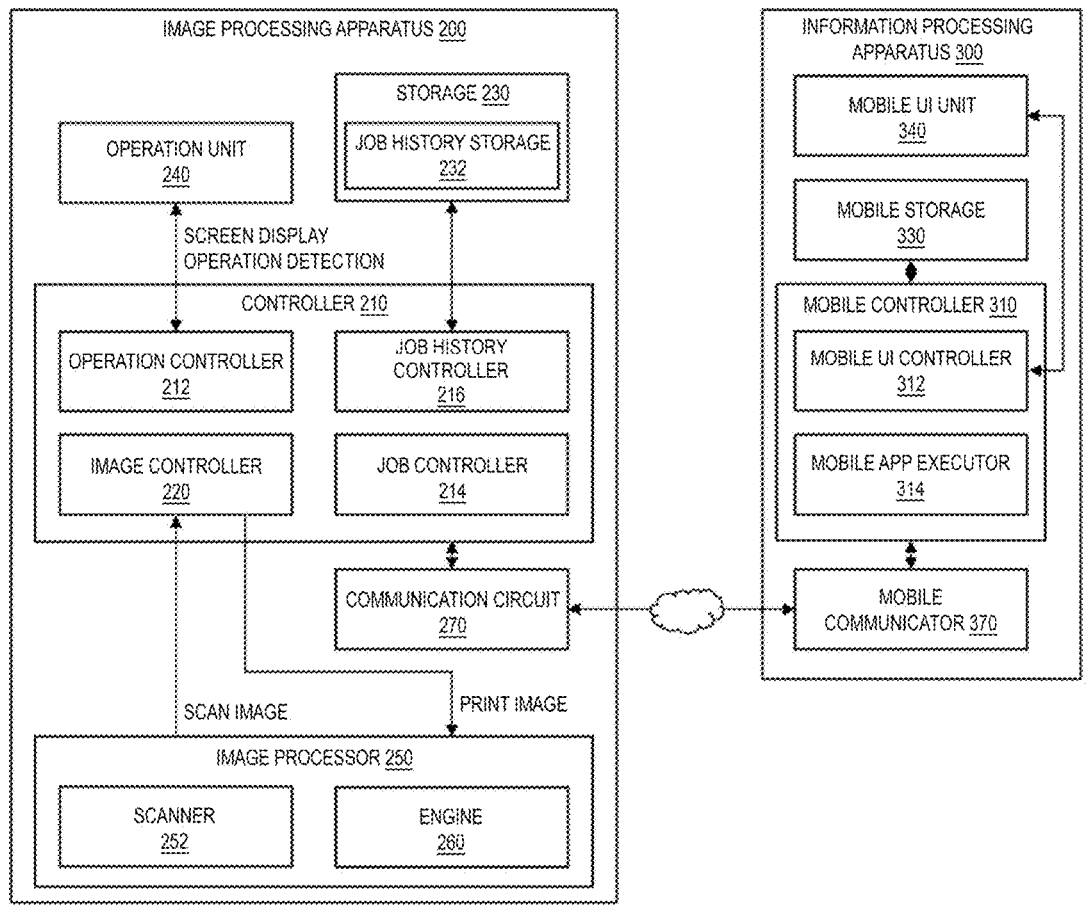
FIG. 2 is an explanatory view illustrating a configuration example of the image processing apparatus and the information processing apparatus illustrated in FIG. 1.

FIG. 2 is an explanatory view illustrating a configuration example of the image processing apparatus and the information processing apparatus illustrated in FIG. 1.

As illustrated in FIG. 1, an image processing apparatus 200 includes an operation unit 240, an image inputter 252, a document feeder 254, an engine 260, a paper feed tray 262, and an ejection tray 264. As illustrated in FIG. 2, the image processing apparatus 200 further includes a controller 210, a storage 230, an image processor 250, and a communication circuit 270. The controller 210 includes an operation controller 212, a job controller 214, a job history controller 216, and an image controller 220. The storage 230 includes a job history storage 232. The image processor 250 includes the image inputter 252 and the engine 260, which are illustrated also in FIG. 1.

As illustrated in FIG. 2, an information processing apparatus 300 includes a mobile controller 310, a mobile storage 330, a mobile UI unit 340, and a mobile communicator 370. The mobile controller 310 includes a mobile UI controller 312 and a mobile app executor 314. The information processing apparatus 300 can communicate with the image processing apparatus 200 via the communicator 370.

The controller 210 mainly includes a processor and a memory as hardware resources. When the processor executes a control program stored in the memory, the respective functions of the operation controller 212, the job controller 214, the job history controller 216, and the image controller 220 described above are achieved.

The operation controller 212 controls display of the operation unit 240 and processes the user operation detected by the operation unit 240.

The job controller 214 controls a job related to image processing. Examples of the job include a copy job of reading a document and printing image data thereof, a scan job of reading a document and outputting or storing the image data, and a print job of developing print data received from an outside and printing the image data.

The job history controller 216 stores, as a job history, in the job history storage 232, a setting related to an executed job, and performs processing of bringing up the stored job history in response to a user operation.

The image controller 220 performs control related to the operations of the image inputter 252 and the engine 260 and image processing.

The storage 230 is configured as a combination of a RAM and a non-volatile memory accessible from the controller 210. The RAM may be applied with a double-data-rate synchronous dynamic random access memory (DDR SDRAM) such as DDR4 and DDR5. The non-volatile memory may be applied with a solid state drive (SSD) or a hard disk drive (HDD). The memory of the controller 210 and at least a part of the hardware of the storage 230 may be common.

The job history storage 232 is a storage area where the job history is stored in the storage 230.

The operation unit 240 includes a display device such as a liquid crystal display (LCD) or an organic light emitting display (OLED) that provides the user with an operation screen related to a state or operation of the image processing apparatus 200, and an input detection device such as a touchscreen that detects a user operation. The operation unit 240 functions as an operation inputter that displays an operation screen and receives a user operation.

The image inputter 252 and the engine 260 constituting the image processor 250 will be described.

The image inputter 252, which is a scanner, for example, is a document-reading part that includes a mechanism, a circuit, and an image sensor for scanning and reading a document. The document feeder 254 illustrated in FIG. 1 is included in the image inputter 252. The image inputter 252 can also be configured as an interface that can acquire, for example, image data stored in a portable storage medium such as a universal serial bus (USB) memory or image data transmitted from an external terminal (information processing apparatus).

In the present disclosure, the engine 260 includes a mechanism and a circuit that perform electrophotographic charging, exposure, development, transfer, and fixing a paper feed tray that stores printing paper, and a paper feed and conveyance mechanism that feeds and conveys the stored printing paper, and performs printing. The electrophotographic method is an example, and printing may be performed by other methods.

Under the control of the job controller 214, the image inputter 252 (scanner) of the image processing apparatus 200 reads and converts, into an image signal, an image of a document. Namely, the image inputter 252 reads a document in a copy job, a fax transmission job, and a scan job, and generates image data. The image inputter 252 receives print data from an external device via the communication circuit 270, and generates image data for printing. The engine 260 performs printing based on image data on a sheet stored in the paper feed tray 262, and ejects the printed sheet to the ejection tray 264.

The communication circuit 270 is a circuit that communicates with an external device via wired communication such as Ethernet or wireless communication such as wireless LAN or Bluetooth (registered trademark).

Components (see FIG. 2) of the information processing apparatus 300 will be described.

The mobile controller 310 is a circuit mainly including a processor and a memory as hardware resources. The mobile controller 310 includes the mobile UI controller 312 and the mobile app executor 314. When the processor executes a control program stored in the memory, the respective functions of the mobile UI controller 312 and the mobile app executor 314 are achieved.

The mobile storage 330 stores a program and data of an app (application) to be executed by the mobile controller 310, data to be displayed on the mobile UI unit 340, and the like. The storage may be applied with an SSD, for example.

The mobile UI unit 340 includes a display device such as a liquid crystal display (LCD) or an organic light emitting display (OLED) that provides the user with an operation screen, and an input detection device such as a touchscreen that detects a user operation.

The mobile communicator 370 is a circuit for the information processing apparatus 300 to communicate with an external device such as the image processing apparatus 200 via wired communication such as Ethernet or wireless communication such as wireless LAN or Bluetooth.

First Embodiment

Job History Screen

Next, the job history screen for selecting and bringing up a job history stored in the job history storage 232 will be described.

First, an example of an operation of bringing up the job history screen will be described.

Figure 3:
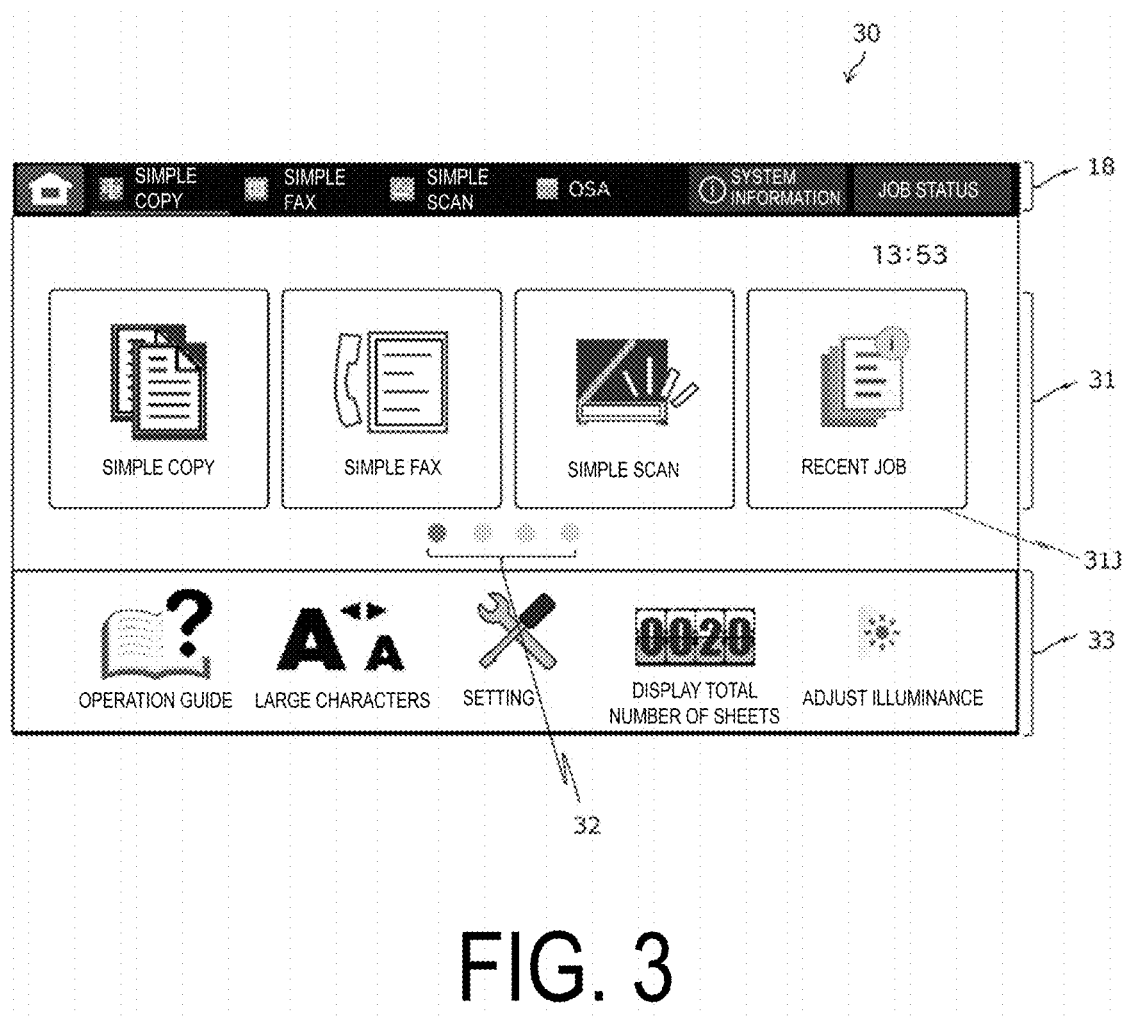
FIG. 3 is an explanatory view illustrating an example of a home screen that a controller illustrated in FIG. 2 causes an operation unit to display.

FIG. 3 is an explanatory view illustrating an aspect of an operation related to bringing up of a job history on the operation screen that the controller 210 causes the operation unit 240 of the image processing apparatus 200 to display. A home screen 30 illustrated in FIG. 3 is an example of the operation screen to be displayed on the operation unit 240. The home screen 30 is a screen in which an icon that transitions the operation screen to a screen for receiving a job setting and job execution frequently used by the user is registered. In the present disclosure, the user can set and change which icons to display on the home screen among icons prepared in advance and in which arrangement to display the icons.

As illustrated in FIG. 3, the home screen 30 includes an icon display area 31 where registered icons are arranged, an icon switch button 32 that switches icons to display, and a function icon display area 33 where function icons that receive settings of various functions are arranged. The icon switch button 32 is an operation object to receive an operation of switching icons to display when more than four icons that can be displayed at a time in the icon display area 31 are registered.

As illustrated in FIG. 3, when a [RECENT JOB] icon 31J is registered on the home screen 30 and touched, the controller 210, as the operation controller 212, causes the operation unit 240 to display the job history stored in the job history storage 232 in response thereto.

Figure 4:
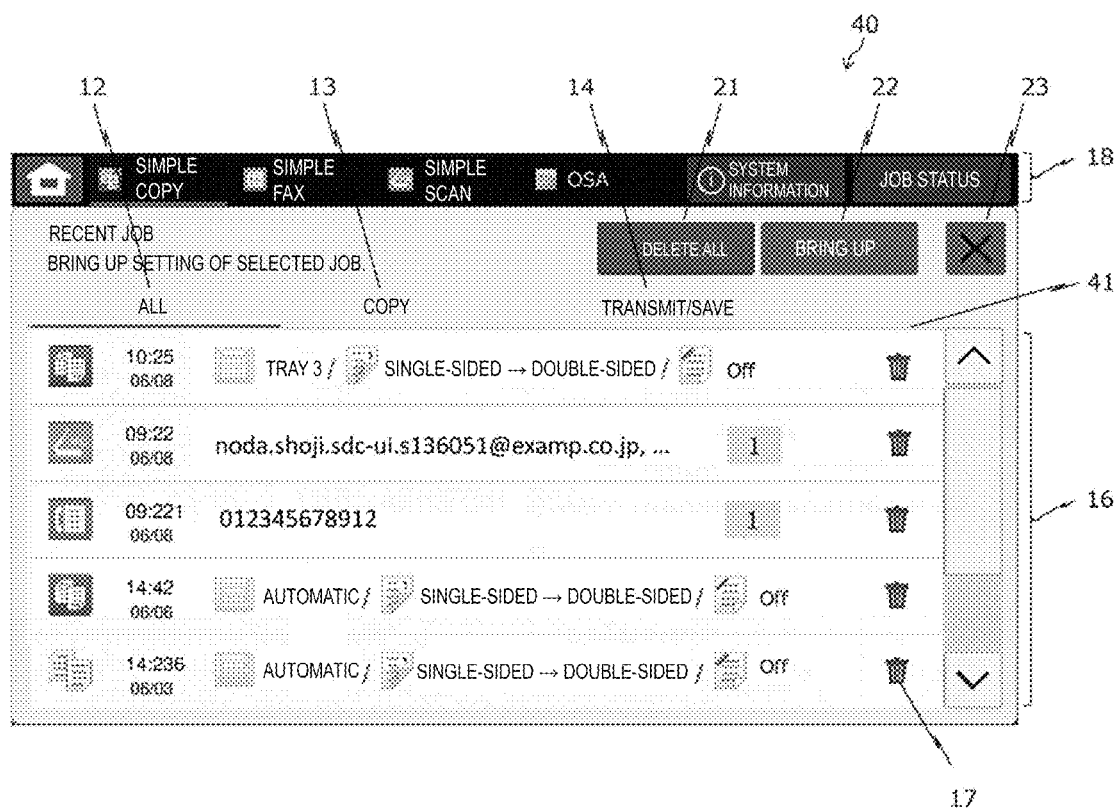
FIG. 4 is an explanatory view illustrating an example of a job history screen that the controller illustrated in FIG. 2 causes the operation unit to display.

FIG. 4 is an explanatory view illustrating an example of a job history screen similar to a job history screen in the related art that the operation controller 212 causes the operation unit 240 to display in response to an bring up operation of the job history such as touching the [RECENT JOB] icon 31J illustrated in FIG. 3. Here, the job history screen similar to the job history screen in the related art is a job history screen that assumes that all the setting items of the job history and the setting values of each setting item are not displayed on the same screen and are omitted. The job history screen is called a job history screen similar to the job history screen in the related art in the sense that the display aspect is similar to that adopted in the known operation screen where the number of pixels and the size of the operation screen are not sufficient.

Registration of a job in the job history storage 232 is performed by the job history controller 216. When the job controller 214 executes the job, the job history controller 216 stores, in the job history storage 232, a setting related to the executed job.

The job history screen 40 illustrated in FIG. 4 includes a job history display area 41 where job histories stored in the job history storage 232 are displayed in a list in order from the latest one.

As illustrated in FIG. 4, the operation controller 212 displays, in the job history display area 41, the date and time when the job related to each job history is executed. An outline of the setting of each job is displayed. For example, for a copy job, the selected paper feed tray, single-sided/double-sided setting, and finishing setting are displayed. For example, in fax transmission or image transmission, the number of destinations is displayed together with the destinations. When there are a plurality of destinations, a number indicating the number of destinations is displayed together with at least one destination. Furthermore, a [DELETE] icon 17 that receives an operation of deleting each job history is displayed.

When any of the job histories displayed in the list in the job history display area 41 is touched, the operation controller 212 recognizes that the job history is selected, and causes the user to recognize the selected state by changing the background color of the target job history (not illustrated in FIG. 4).

When the number of job histories stored in the job history storage 232 exceeds the number of job histories that can be displayed at a time in the job history display area 41, the job history controller 216 causes a scroll bar 16 to be displayed on a right side of the job history display area 41. In response to the operation of the scroll bar 16, the job history controller 216 scrolls up or down the list of job histories displayed in the job history display area 41. The scroll bar 16 is an operation object for switching the list of job histories to be displayed in the job history display area 41. The scroll operation enables the user to cause all the job histories stored in the job history storage 232 to be displayed in the job history display area 41. According to this aspect, the user can switch the display of the job history through an intuitive operation of operating the scroll bar.

Above the job history display area 41, operation objects of an [ALL] tab 12, a [COPY] tab 13, and a [TRANSMIT/SAVE] tab 14 are displayed side by side. FIG. 4 illustrates a state where the [ALL] tab 12 is alternatively selected. In this case, the operation controller 212 sets all the jobs registered in the job history storage 232 to be the display target in the job history display area 41. When the [COPY] tab 13 is selected, the operation controller 212 sets only the copy job among jobs registered in the job history storage 232 to be the display target in the job history display area 41. When the [TRANSMIT/SAVE] tab 14 is selected, the operation controller 212 sets the fax transmission job and the scan job among the jobs registered in the job history storage 232 to be the display target in the job history display area 41.

Operation objects of a [DELETE ALL] key 21, a [BRING UP] key 22, and a [×] key 23 are arranged above the [TRANSMIT/SAVE] tab 14.

When the [DELETE ALL] key 21 is touched, the operation controller 212 displays a confirmation pop-up window (not illustrated in FIG. 4) including an [OK] key and a [CANCEL] key. When the [OK] key is pressed, the job history controller 216 deletes all the job histories stored in the job history storage 232.

When the [BRING UP] key 22 is touched, the operation controller 212 displays the confirmation pop-up window (not illustrated in FIG. 4) including the [OK] key and the [CANCEL] key. When the [OK] key is pressed, the job history controller 216 brings up and applies, as the current setting, the setting of the selected job history.

Note that in place of providing the [BRING UP] key 22 illustrated in FIG. 4, for example, when the job history is touched, the setting of the touched job history may be brought up in response thereto and applied as the current setting.

When the [×] key is touched, the operation controller 212 returns the operation screen to the state before displaying the job history screen 40. In the above example, the operation screen is returned to the home screen 30.

Note that the operation controller 212 causes a top bar 18 to be displayed at the upper ends of almost all operation screens including the home screen 30 and the job history screen 40. On the top bar 18, operation objects (shortcut icons) that transition to the home screen or operation screens related to four representative jobs (simple copy, simple fax, simple scan, and third-party application (OSA) in the example illustrated in FIG. 4) are arranged. Furthermore, a key to receive display of system information and a key to receive display of a job status are arranged as operation objects.

Figure 5:
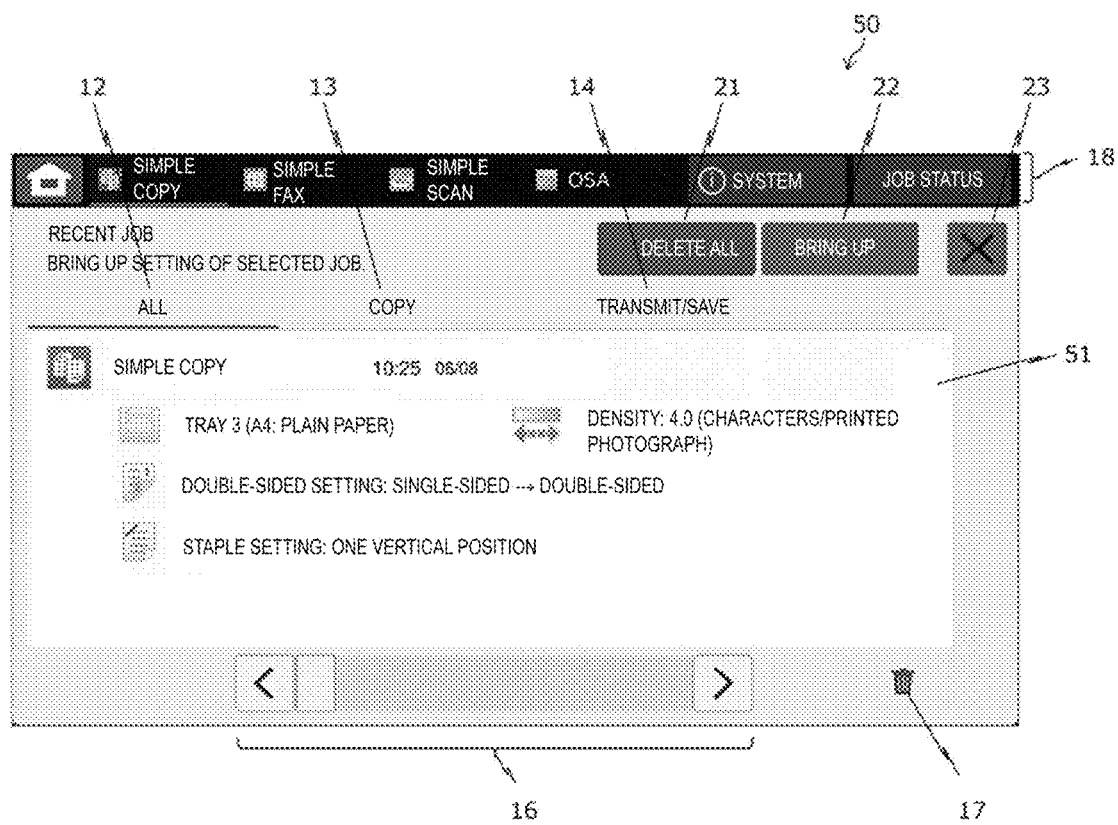
FIG. 5 is an explanatory view illustrating an example of a characteristic job history screen of the present disclosure that the controller illustrated in FIG. 2 causes the operation unit to display.

FIG. 5 is an explanatory view illustrating an example of a job history screen different from that in FIG. 4. On a job history screen 50 of FIG. 5 in place of the job history display area 41 illustrated in FIG. 4, the job history controller 216 causes all the setting items changed from a standard state (initial value) and the setting content of each item to be displayed in a job history display area 51 for one job history. The job history displayed in the job history display area 51 corresponds to the job history in a state of being selected on the job history screen 40 of FIG. 4. On the job history screen 50, the operation of selecting another job history is performed with the scroll bar 16 displayed below the job history display area 51. When causing the job history screen 50 to be displayed, the job history controller 216 selects the latest job history and causes the latest job history to be displayed in the job history display area 51. When the scroll bar 16 is scrolled to the right, the job history controller 216 sequentially switches the selection to the old job history and causes the setting items and the setting content to be displayed in the job history display area 51. Conversely, when the scroll bar 16 is scrolled to the left, the job history controller 216 sequentially switches the selection to the new job history. The scroll bar 16 is an operation object that switches the job history to be displayed in the job history display area 51.

In the example illustrated in FIG. 5, the selected job history is a copy job. A tray 3 is selected as the paper feed tray, and double-sided printing of a single-sided document is set as the double-sided setting. Furthermore, vertical stapling is set at one location, and the density is set to 4.0, which is higher than the standard 3.0. The other setting items remain in the standard state. When there are too many items changed from the standard state to be displayed at a time in the job history display area 51, it is sufficient that scrolling is enabled by using a vertical scroll bar as illustrated in FIG. 4 so that all the setting items and setting values can be displayed in the job history display area 51.

According to this aspect, the user can confirm all the setting items and setting values before bringing up the job history on the job history screen. Therefore, it is no longer necessary to confirm the setting after bringing up the job history. By operating the scroll bar 16, it is possible to switch the display to a different job history, to display, on the job history screen, any job history stored in the job history storage 232, and to confirm all the setting items and setting values.

Here, the standard state is content set as an initial value when the operation controller 212 displays an operation screen related to a job. The setting item for which the job has been executed without changing the initial value on the operation screen remains in the standard state.

At least a part of the initial values may be selectable or settable for the user. In that case, if the currently selected or set initial value and the setting value of the executed job are the same, the setting item is in the standard state.

Figure 6:
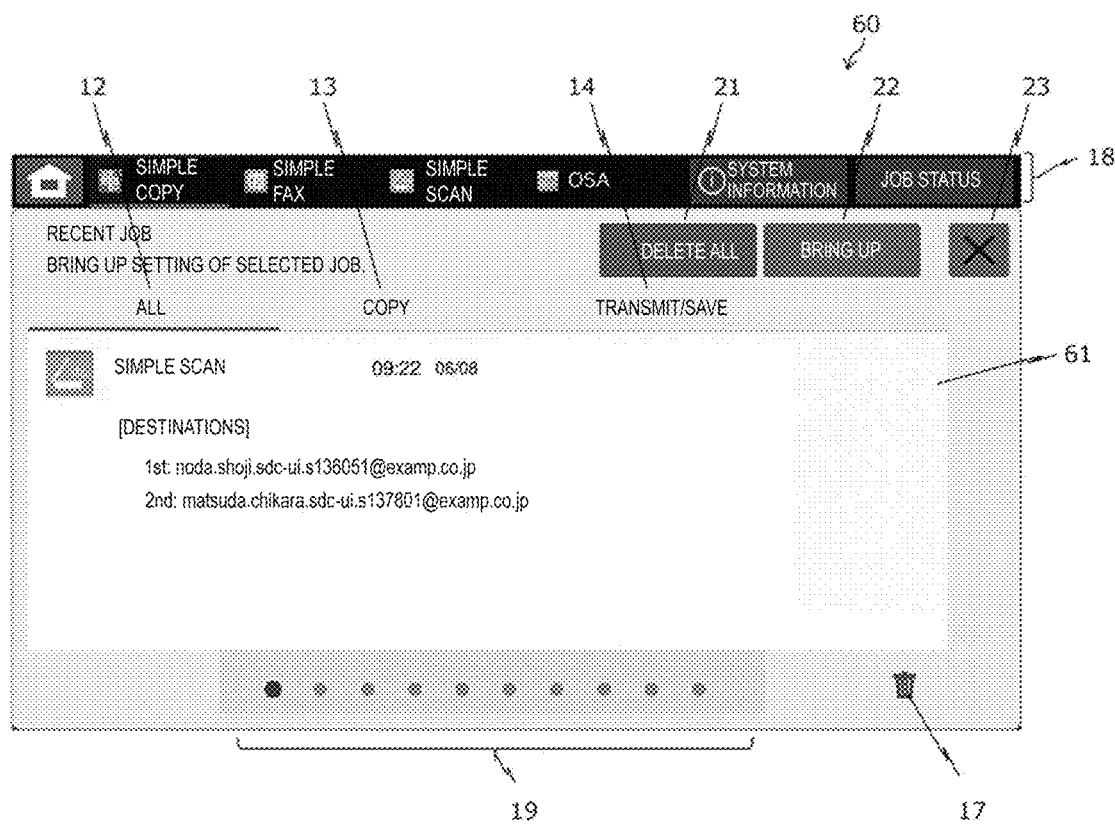
FIG. 6 is an explanatory view illustrating another example of the characteristic job history screen of the present disclosure that the controller illustrated in FIG. 2 causes the operation unit to display.

FIG. 5 is a job history of a copy job. On the other hand, FIG. 6 illustrates an example of a job history of a scan job (image transmission). In the example illustrated in FIG. 6, since the initial value of the destination is empty and the other setting items remain in the standard state, two destinations are displayed in a job history display area 61. All the mail addresses of two destinations are displayed at a time in the job history display area 61.

As described with reference to FIG. 5, when there is a large number of items changed from the standard state or when there are too many destinations to be displayed at a time in the job history display area 61, it is sufficient that scrolling is enabled by using a vertical scroll bar as illustrated in FIG. 4 so that all the setting items and setting values can be displayed in the job history display area 61. When the destination address is too long to be displayed in one line in the job history display area 61, the destination address may be wrapped in two lines or scrolling may be enabled by using a horizontal scroll bar.

The example illustrated in FIG. 5 illustrates an aspect in which selection of the job history is switched by using the horizontal scroll bar. In the example illustrated in FIG. 6, a job history selection button 19 is illustrated as a different aspect of the operation of switching selection of the job history. The plurality of buttons arranged side by side correspond to any job history stored in the job history storage 232. The job history controller 216 juxtaposes, on a job history screen 60, the job history selection buttons 19 corresponding to the number of stored job histories. The leftmost black button corresponds to the job history in a selected state and displayed in the job history display area 61. The gray buttons correspond to other job histories that are not selected.

Use of the job history selection button 19 makes clear distinction from the operation of horizontally scrolling the display in the job history display area 61. It becomes possible to perform an intuitive operation of directly selecting each job history.

Flowchart

Next, in the present disclosure, a flow of processing executed by the controller 210 regarding the job history screen will be described with reference to a flowchart.

Figure 7:
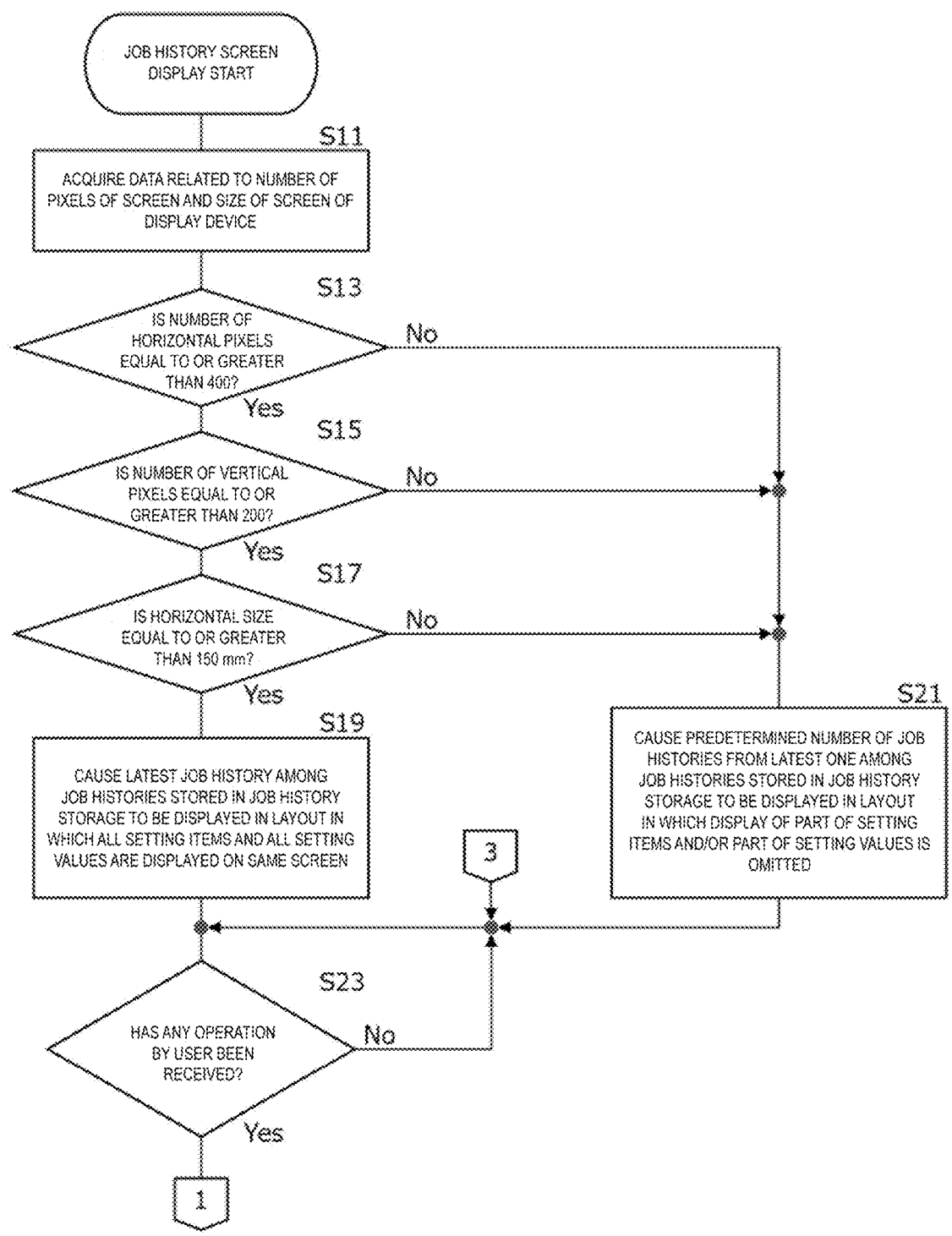
FIG. 7 is a flowchart (first half) showing an example of processing regarding a job history screen executed by the controller illustrated in FIG. 2.
Figure 8:
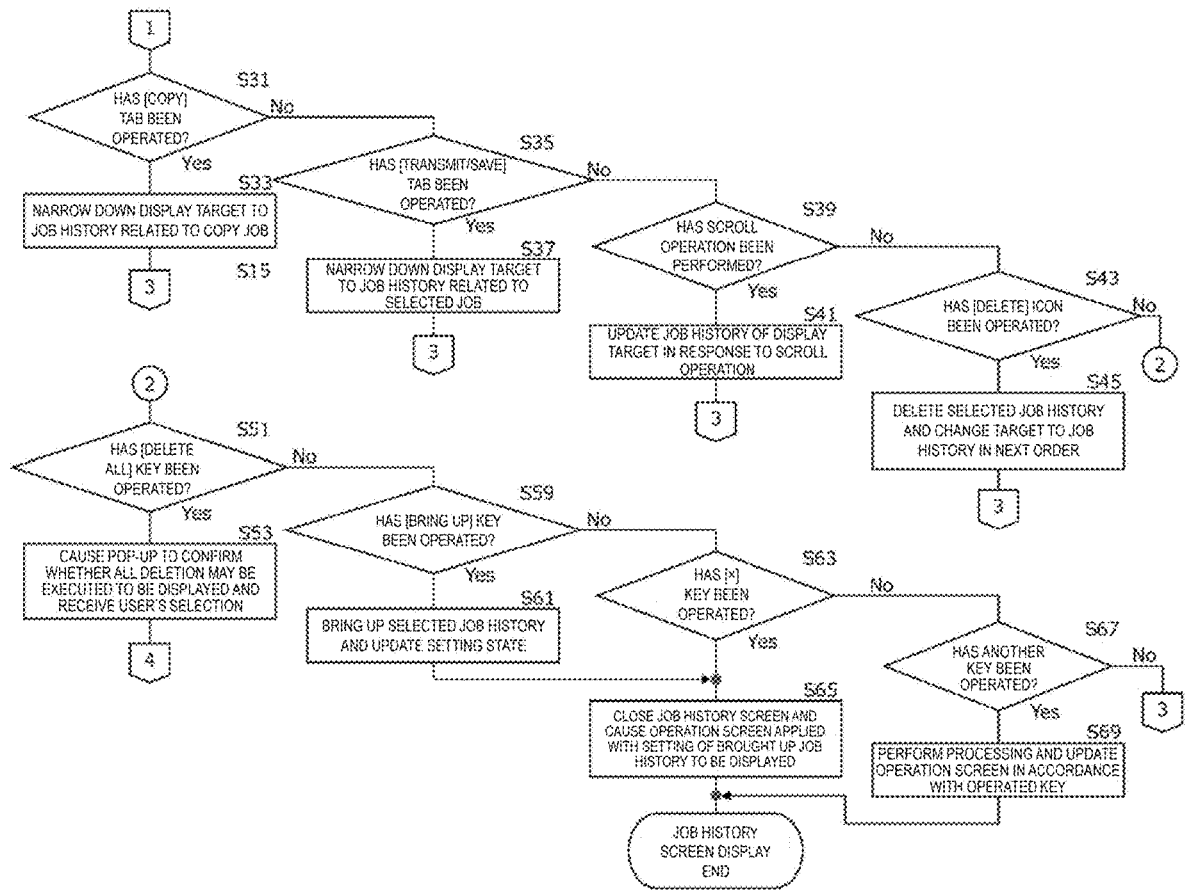
FIG. 8 is a flowchart (second half) showing the example of processing regarding the job history screen executed by the controller illustrated in FIG. 2.

FIGS. 7 and 8 are flowcharts illustrating an example of processing regarding the job history screen executed by the controller 210.

As the operation controller 212, the controller 210 acquires data related to the number of pixels of the screen and the size of the screen of the display device included in the operation unit 240 of the image processing apparatus 200 at the time point of starting the execution of the processing (step S11 in FIG. 7). It is assumed that the data indicates an attribute of the display device included in the operation unit 240 and can be acquired from the display device of the operation unit 240 or from the storage 230.

The operation controller 212 determines whether the number of pixels in the horizontal direction (the number of horizontal pixels) of the display screen is equal to or greater than a predetermined value (e.g., 400 pixels) (step S13).

When the number of horizontal pixels is equal to or greater than the predetermined value, the operation controller 212 subsequently determines whether the number of pixels in the vertical direction (the number of vertical pixels) of the display screen is equal to or greater than a predetermined value (e.g., 200 pixels) (step S15).

When the number of vertical pixels is equal to or greater than the predetermined value, the operation controller 212 subsequently determines whether the size in the horizontal direction of the display screen is equal to or greater than a predetermined value (e.g., 150 mm) (step S17).

When the numbers of vertical and horizontal pixels in steps S13 and S15 are both equal to or greater than the predetermined values (determination is Yes) and the size in step S17 is equal to or greater than the predetermined value (determination is Yes), the controller 210 determines that the information amount that can be displayed on the operation screen is sufficient. It is then determined that the controller 210 causes the operation unit 240 to display the job history screen having the aspect as illustrated in FIGS. 5 and 6 (step S19). That is, the job history screen in an aspect of displaying all the setting items and setting values of the selected job history at once is displayed.

On the other hand, when at least any of the determination of the numbers of vertical and horizontal pixels in steps S13 and S15, and the determination of the size in step S17 does not satisfy the condition (determination is No), the controller 210 determines that the information amount that can be displayed on the operation screen is not sufficient. It is then determined that the controller 210 causes the operation unit 240 to display the job history screen in an aspect similar to the job history screen in the related art as illustrated in FIG. 4 (step S21). That is, the job history screen is displayed in an aspect where there is a possibility of omitting display of any of the setting item and the setting value of the selected job history.

The flowchart shown in FIG. 7 is based on the assumption that the control program thereof is applied to a plurality of types of image processing apparatuses. When the control program is installed in the image processing apparatus 200 of a specific model, since the operation unit 240 is determined, the determination shown in steps S13 to S17 always has the same result. However, the determination of the control program may have different results among different models. As described later as the third embodiment, when the job history screen is displayed on an external device, different determination results are obtained depending on the device caused to display.

After the display aspect to be applied to the job history screen is determined as described above, the controller 210 as the job history controller 216 causes the job history screen to be displayed in response to the operation of causing the job history screen to be displayed. Then, the controller 210 waits for the user operation in the displayed job history screen (loop of No in step S23).

The following description assumes that the job history screen 50 of FIG. 5 characteristic of the present disclosure is displayed. However, the content of the processing is the same for the job history screen 60 illustrated in FIG. 6 or the job history screen 40 similar to the job history screen in the related art illustrated in FIG. 4.

When the user operation is received on the job history screen 50, the controller 210 as the job history controller 216 performs processing in response to the received operation.

As illustrated in FIG. 8, the job history controller 216 determines whether the [COPY] tab 13 has been operated (step S31).

When the [COPY] tab 13 is operated (Yes in step S31) and when the job history displayed in the job history display area 51 is not related to the copy job, the job history of the display target is switched to one related to the copy job (step S33). That is, the job history of the display target is narrowed down to those related to the copy job. Then, the processing returns to step S23 in FIG. 7 to wait for another operation.

When the operation performed by the user is not an operation on the [COPY] tab 13 (No in step S31), the job history controller 216 subsequently determines whether the [TRANSMIT/SAVE] tab 14 has been operated (step S35).

When the [TRANSMIT/SAVE] tab 14 is operated (Yes in step S35) and when the job history displayed in the job history display area 51 is not a job of reading, transmitting, or saving a document, such as a scan job, the job history of the display target is switched to one related to transmission or saving (step S37). That is, the job history of the display target is narrowed down to those related to transmission or saving. Then, the processing returns to step S23 in FIG. 7 to wait for another operation.

When the operation performed by the user is not an operation on the [TRANSMIT/SAVE] tab 14 (No in step S35), the job history controller 216 subsequently determines whether the scroll bar 16 has been operated (step S39).

When the scroll bar 16 is operated (Yes in step S39), the selected job history is switched to one corresponding to the scroll operation, and the job history displayed in the job history display area 51 is updated to the selected job history (step S41). Then, the processing returns to step S23 in FIG. 7 to wait for another operation.

When the operation performed by the user is not an operation on the scroll bar 16 (No in step S39), the job history controller 216 subsequently determines whether the [DELETE] icon 17 has been operated (step S43).

When the [DELETE] icon 17 is operated (Yes in step S43), the selected job history is deleted, a new job history is selected, and the newly selected job history is displayed in the job history display area 51 (step S45). Then, the processing returns to step S23 in FIG. 7 to wait for another operation.

When the operation performed by the user is not an operation on the [DELETE] icon 17 (No in step S43), the job history controller 216 subsequently determines whether the [DELETE ALL] key 21 has been operated (step S51).

Figure 9:
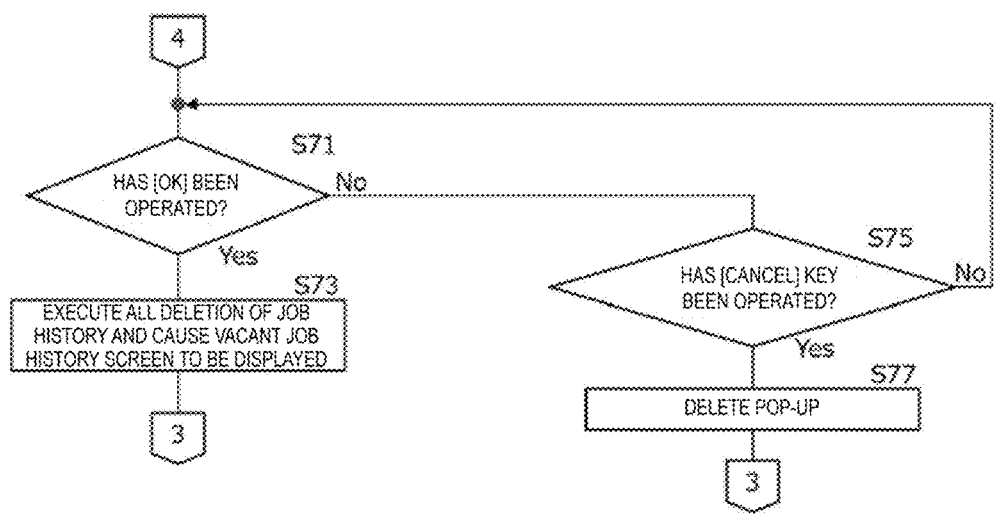
FIG. 9 is a flowchart (processing related to a [DELETE ALL] key) illustrating an example of processing regarding the job history screen executed by the controller illustrated in FIG. 2.

When the [DELETE ALL] key 21 is operated (Yes in step S51), the job history controller 216 causes a pop-up window not illustrated that confirms whether all the job histories may be deleted to be displayed (step S53). The pop-up window includes the [OK] key and the [CANCEL] key. The job history controller 216 waits for the operation on the [OK] key or the [CANCEL] key (loop of returning to S71 through No in step S71 and No in step S75 illustrated in FIG. 9).

When the [OK] key is pressed (Yes in step S71), the job history controller 216 deletes all the job histories stored in the job history storage 232 (step S73). The job history display area 51 is updated to a blank in accordance with the deletion of all the jobs. Then, the processing returns to step S23 in FIG. 7 to wait for another operation.

When the [CANCEL] key is pressed (Yes in step S75), the job history controller 216 deletes the pop-up window (step S77). Then, the processing returns to step S23 in FIG. 7 to wait for another operation.

Returning to the description of FIG. 8, when the operation performed by the user is not an operation on the [DELETE ALL] key 21 in step S51 (No in step S51), the job history controller 216 subsequently determines whether the [BRING UP] key 22 has been operated (step S59).

When the [BRING UP] key 22 is operated (Yes in step S59), the job history controller 216 brings up and applies, to the current setting, the selected job history. Then, the job history screen 50 that is being displayed is closed, and an operation screen applied with the settings of the brought up job history is caused to display (step S65). Then, the processing ends.

When the operation performed by the user is not an operation on the [BRING UP] key 22 (No in step S59), the job history controller 216 subsequently determines whether the [×] key 23 has been operated (step S63).

When the [×] key 23 is operated (Yes in step S63), the job history controller 216 closes the job history screen 50 that is being displayed and returns to the operation screen before the job history screen 50 is displayed (step S65). Then, the processing ends.

When the operation performed by the user is not an operation on the [×] key 23 but another operation is performed (No in step S67), processing corresponding to the operated key and update of the operation screen are performed (step S69), and the processing ends.

If no other operation is performed and the processing waits for a user operation (No in step S67), the job history controller 216 returns the processing to step S23 in FIG. 7 and waits for a user operation.

The above is the flow of processing related to the operation of the job history screen.

Second Embodiment

In the first embodiment, it has been described that upon determining that the information amount that can be displayed on the operation screen is sufficient, the operation controller 212 causes a job history screen to be displayed in an aspect of displaying at a time all the setting items and setting values of one selected job history as illustrated in FIGS. 5 and 6. In this embodiment, an example will be described of a job history screen when it is determined that the information amount that can be displayed on the operation screen is sufficient to display at a time all the setting items and setting values of a plurality of job histories.

Figure 10:
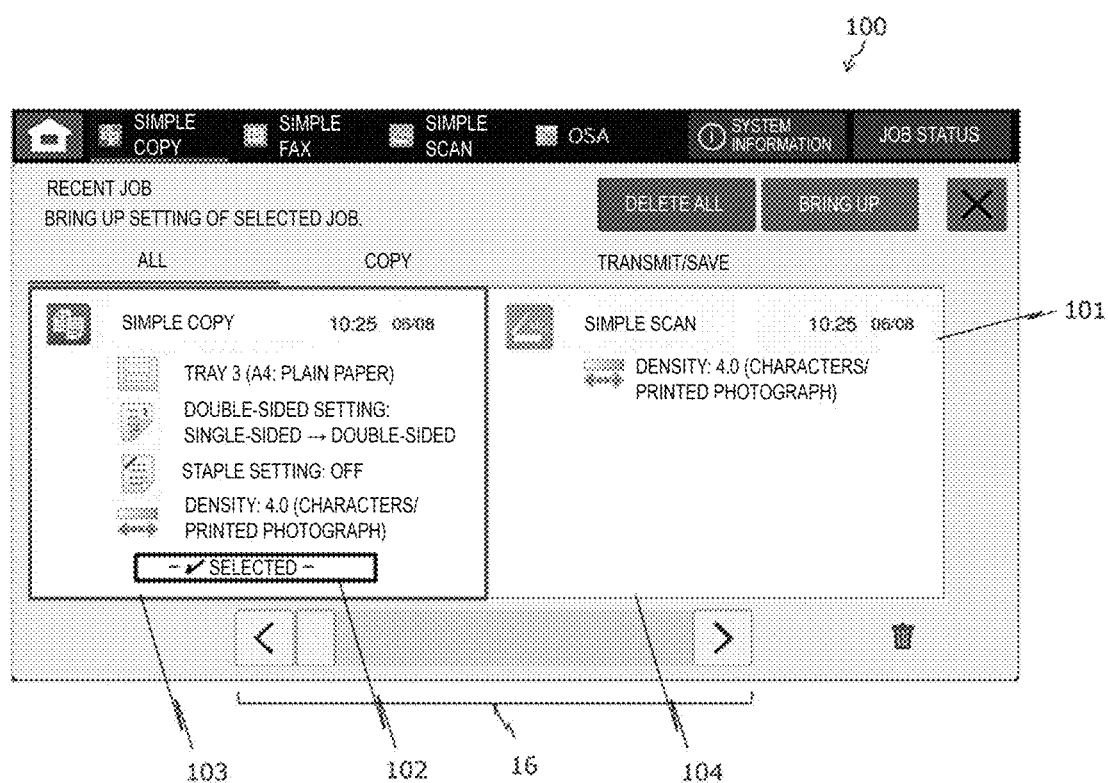
FIG. 10 is a first explanatory view illustrating an example different from FIGS. 5 and 6 of the characteristic job history screen of the present disclosure. Second Embodiment
Figure 11:
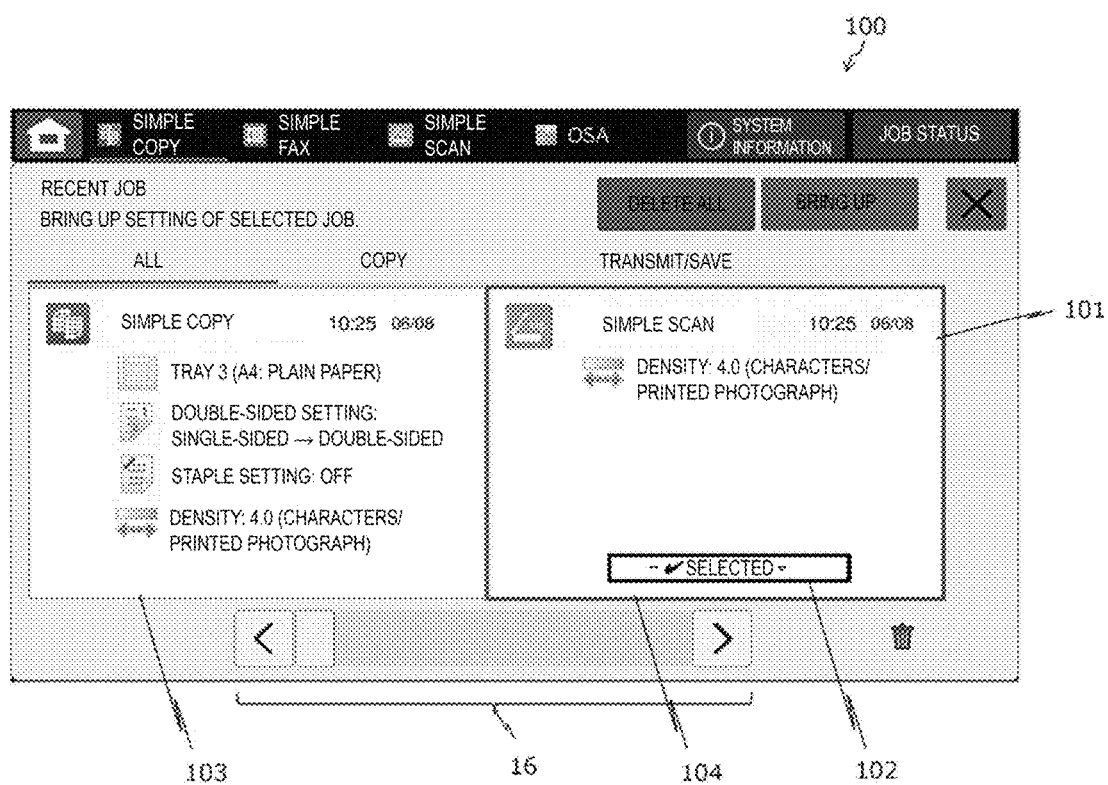
FIG. 11 is a second explanatory view illustrating an example different from FIGS. 5 and 6 of the characteristic job history screen of the present disclosure. Second Embodiment
Figure 12:
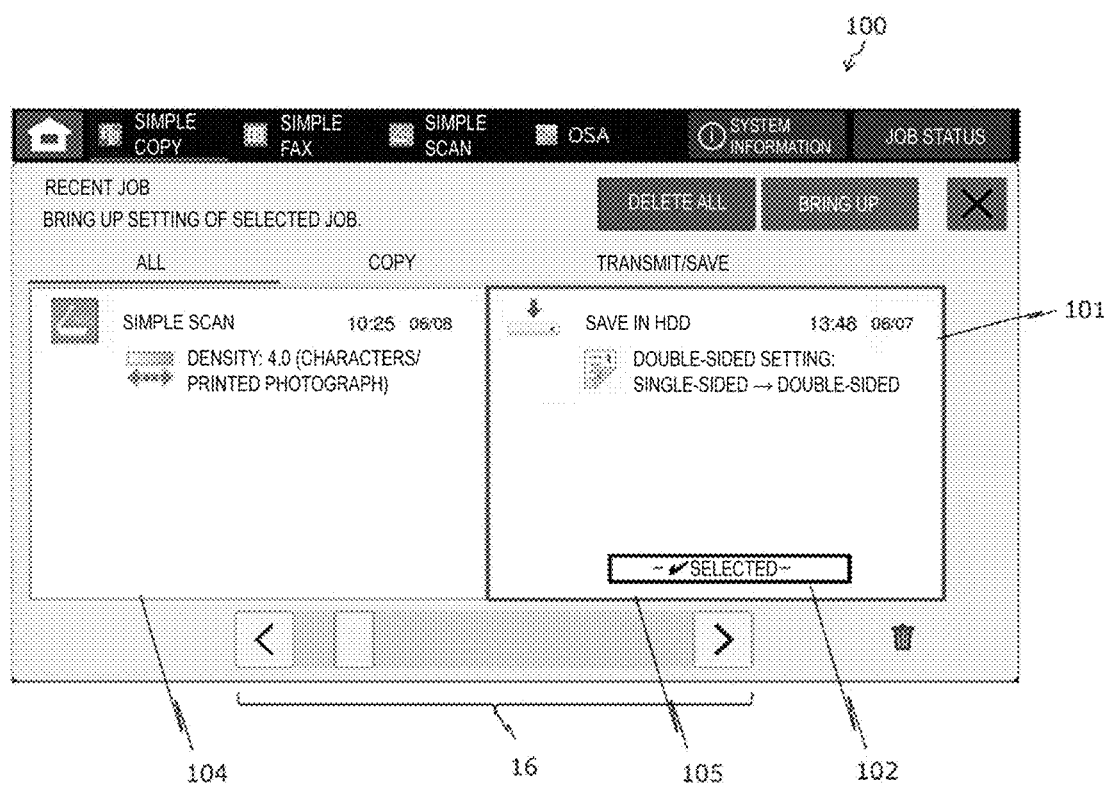
FIG. 12 is the second explanatory view illustrating an example different from FIGS. 5 and 6 of the characteristic job history screen of the present disclosure. Second Embodiment

FIGS. 10 to 12 are explanatory views illustrating examples of a job history screen according to this embodiment. As illustrated in FIG. 10, the job history controller 216 causes a job history display area 101 of a job history screen 100 to display two job histories 103 and 104. For any of the job histories 103 and 104, all setting items and setting values are displayed at once.

Since the job history display area 101 is caused to display the plurality of job histories 103 and 104, it is necessary to indicate which job history is in a selected state. Therefore, a thick frame line is displayed in the display area of the job history 103 and the display area of the job history 103 is caused to display a selection state icon 102, thereby indicating that the job history 103 is in the selected state. The job history 104 for which the thick frame line and the selection state icon are not displayed is in a non-selected state.

When the display area of the job history 104 is touched in this state, the job history controller 216 switches the job history in the selected state to the job history 104. FIG. 11 illustrates a state where the job history 104 is touched and switched to the selected state. The job history controller 216 displays a thick frame line in the display area of the job history 104 and causes the display area of the job history 104 to display the selection state icon 102. The job history 103 for which the thick frame line and the selection state icon are not displayed is in a non-selected state.

When a scroll operation is performed with the scroll bar 16 on the job history screen 100 in the state illustrated in FIG. 11, the job history controller 216 updates the job history that the job history display area 101 is caused to display. Specifically, when an arrow key present at the right end of the scroll bar 16 in FIG. 11 is operated, the display in the job history display area 101 is shifted to the left by one step. That is, the job history 103 displayed on the left side is deleted, and the job history 104 displayed on the right side is displayed in place. Then, the job history display area on the right side is caused to display the job history 105. The job history 103 is the latest job history, and the job histories 104 and 105 are job histories older than the job history 103 in this order.

The selection state icon 102 is displayed for the job history displayed on the right side of the job history display area 101. The job history in the selected state is switched by the scroll operation similarly to the example illustrated in FIG. 5.

As in this embodiment, if the information amount that can be displayed on the operation screen is sufficient, setting items and setting values of a plurality of job histories may be displayed at once. By doing so, before bringing up a job history on the job history screen, the user can confirm, on one screen, all the setting items and setting values of the plurality of job histories without switching screens. Therefore, it is no longer necessary to confirm the setting after bringing up the job history. By operating the scroll bar 16, it is possible to switch the display to a different job history, to display, on the job history screen, any job history stored in the job history storage 232, and to confirm all the setting items and setting values.

Third Embodiment

In the first embodiment, the job history screen displayed on the operation unit 240 of the image processing apparatus 200 has been described. However, in the present disclosure, the target of displaying the job history screen is not limited thereto, and an external information processing apparatus that can communicate with the image processing apparatus 200 may be caused to display the job history screen. In a case of an information processing apparatus that communicates with the image processing apparatus 200 and includes a display device and an input detection device, the controller 210 of the image processing apparatus 200 may cause the information processing apparatus to display a job history screen by remote control, and may receive a user operation on the displayed job history screen.

The information processing apparatus 300 (e.g., a smartphone) illustrated in FIGS. 1 and 2 is assumed to be an external information processing apparatus caused to display a job history screen in this embodiment. The mobile UI unit 340 corresponds to the operation unit 240 of the image processing apparatus 200. An instruction related to screen display is performed by the operation controller 212, and the mobile UI controller 312 via communication causes the mobile UI unit 340 to display a screen in accordance with the instruction. The mobile UI controller 312 notifies, via communication, the operation controller 212 of the user operation detected by the mobile UI unit 340.

The job history screen that the controller 210 causes the mobile UI unit 340 to display by remote control may be similar to those in FIGS. 4 to 6. Alternatively, it may be similar to those in FIGS. 10 to 12.

When the mobile UI unit 340 is caused to display the job history screen by remote control, the user may be caused to select the target to cause the job history screen to display before the processing of step S11 of the flowchart shown in FIG. 7. This is a selection of causing the operation unit 240 to display or causing an information processing apparatus such as a smartphone used by the user to display. Upon receiving the selection of causing the information processing apparatus 300 to display the job history screen, the controller 210 determines the number of vertical and horizontal pixels and the size in steps S11 to S17 targeting the mobile UI unit 340.

Alternatively, when the operation of causing the job history screen to be displayed is received, the user may be caused to select the target to cause the job history screen to display at that time point, and the number of vertical and horizontal pixels and the size may be determined targeting the selected device. Instead of determining the number of vertical and horizontal pixels and the size at the time point of start of processing as illustrated in FIG. 7, the number of vertical and horizontal pixels and the size are determined when the operation of causing the job history screen to be displayed is received.

According to this aspect, even if the information amount that can be displayed on the operation screen of the operation unit 240 of the image processing apparatus 200 is not sufficient, if there is an information processing apparatus that can display a sufficient information amount on the screen, the information processing apparatus can be caused to display all the setting items and setting values of the job history. This enables the user to confirm all the setting items and setting values before bringing up the job history on the job history screen. Therefore, it is no longer necessary to confirm the setting after bringing up the job history.

In the present disclosure described above, one screen or the same screen includes a screen that can be displayed by moving a display area by a scroll operation. There is a case where it is not possible to determine in advance whether information to be displayed falls within the number of vertical and horizontal pixels of the display device. This is because even a display device having a sufficient number of pixels that can be displayed normally without scrolling has difficulty in ensuring that information to be displayed always falls within that number of pixels. Such cases include a case where the number of destinations for broadcast transmission is tens of destinations, which is larger than several of the destinations assumed in normal use.

It should be understood that the present disclosure also includes a combination of any of the plurality of aspects described above.

In addition to the above-described embodiments, there can be various modifications of the present disclosure. It should not be understood that those modifications do not belong to the scope of the present disclosure. The invention according to the present disclosure should include meanings equivalent to the claims and all modifications belonging to the scope of the present disclosure.

REFERENCE SIGNS LIST

12: [ALL] tab, 13: [COPY] tab, 14: [TRANSMIT/SAVE] tab, 16: scroll bar, 17: [DELETE] icon, 18: top bar, 19: job history selection button, 21: [DELETE ALL] key, 22: [BRING UP] key, 23: [×] key

30: home screen, 31: icon display area, 31J: [RECENT JOB] icon, 32: icon switch button, 33: function icon display area, 40, 50, 60, 100: job history screen, 41, 51, 61, 101: job history display area, 102: selection state icon, 103, 104, 105: job history

200: image processing apparatus, 210: controller, 212: operation controller, 214: job controller, 216: job history controller, 220: image controller, 230: storage, 232: job history storage, 240: operation unit, 250: image processor, 252: image inputter, 254: document feeder, 260: engine, 262: paper feed tray, 264: ejection tray, 270: communication circuit, 300: information processing apparatus, 310: mobile controller, 312: mobile UI controller, 314: mobile app executor, 330: mobile storage, 340: mobile UI unit, 370: mobile communicator

The invention claimed is:

1. An image processing apparatus comprising:
an operation inputter that displays an operation screen and receives a user operation;
an image processor that executes a job related to image processing;
a storage that stores settings related to a plurality of executed jobs, as a plurality of job histories; and
one or more controllers, wherein
the one or more controllers:
cause the operation inputter to display a job history screen as the operation screen to bring up any of the plurality of job histories stored in the storage;
cause one screen of the job history screen to display all setting items and setting values associated with the setting items of the plurality of job histories and to display at least one job history, among the plurality of job histories, that is in a selected state; and
cause another screen of the job history screen to display an operation object to receive an operation of bringing up one job history selected from the plurality of job histories and another operation object to receive an operation of switching a displayed job history to a different job history, among the plurality of job histories, to be displayed.

2. The image processing apparatus according to claim 1, wherein the one or more controllers further:
cause the job history screen to display any one of the plurality of job histories;
cause the job history screen to display another operation object to receive an operation of bringing up any one of the plurality of job histories displayed; and
cause one or more operations for one or more operation objects to be received.

3. The image processing apparatus according to claim 1, wherein the other operation object to receive the operation of switching the displayed job history to the different job history, among the plurality of job histories, is a scroll bar or a button juxtaposed based on a number of the plurality of job histories.

4. An image processing apparatus comprising:
a communicator that communicates with an external device that displays a screen and receives a user operation;
an image processor that executes a job related to image processing;
a storage that stores settings related to a plurality of executed jobs, as a plurality of job histories; and
one or more controllers, wherein
the one or more controllers:
cause the screen of the external device to display, via the communicator, a job history screen to bring up any of the plurality of job histories stored in the storage;
cause one screen of the job history screen to display all setting items and setting values associated with the setting items of the plurality of job histories and to display at least one job history, among the plurality of job histories, that is in a selected state; and
cause another screen of the job history screen to display an operation object to receive an operation of bringing up one job history selected from the plurality of job histories and another operation object to receive an operation of switching a displayed job history to a different job history, among the plurality of job histories, to be displayed.

5. The image processing apparatus according to claim 4, wherein the one or more controllers further:
cause the job history screen to display any one of the plurality of job histories;
cause the job history screen to display another operation object to receive an operation of bringing up any one of the plurality of job histories displayed; and
cause one or more operations for one or more operation objects to be received via the communicator.

6. A method for bringing up a job history, the method comprising:
displaying an operation screen on an image processing apparatus or an external device, and receiving a user operation;
executing a job related to image processing by using an image processor of the image processing apparatus;
storing, in a memory of the image processing apparatus, settings related to a plurality of executed jobs that is capable of being brought up, as a plurality of job histories;
displaying, as the operation screen, a job history screen to display all setting items and setting values associated with the setting items of the plurality of job histories and to display at least one job history, among the plurality of job histories, that is in a selected state; and
displaying one screen of the job history screen to display an operation object to receive an operation of bringing up one job history selected from the plurality of job histories and another operation object to receive an operation of switching a displayed job history to a different job history, among the plurality of job histories, to be displayed.

* * * * *